United States Patent
Hunter

(10) Patent No.: US 8,384,570 B2
(45) Date of Patent: Feb. 26, 2013

(54) ENCODER INTERPOLATOR WITH ENHANCED PRECISION

(75) Inventor: Bradley Hunter, Lexington, MA (US)

(73) Assignee: Active Precision, Inc., Burlington, MA (US)

( * ) Notice: Subject to any disclaimer, the term of this patent is extended or adjusted under 35 U.S.C. 154(b) by 469 days.

(21) Appl. No.: 12/800,206

(22) Filed: May 11, 2010

(65) Prior Publication Data

US 2010/0303460 A1    Dec. 2, 2010

Related U.S. Application Data

(60) Provisional application No. 61/217,121, filed on May 27, 2009.

(51) Int. Cl.
    *H03M 1/48*    (2006.01)
(52) U.S. Cl. ............. 341/112; 341/1; 341/115; 341/116
(58) Field of Classification Search ............... 341/1–16, 341/111–116
    See application file for complete search history.

(56) References Cited

U.S. PATENT DOCUMENTS

| | | | | |
|---|---|---|---|---|
| 4,225,931 A | 9/1980 | Schwefel | | 364/577 |
| 5,066,953 A | 11/1991 | Lengenfelder et al. | | 341/155 |
| 5,121,116 A | * | 6/1992 | Taniguchi | 341/116 |
| 5,134,404 A | | 7/1992 | Peterson | 341/116 |
| 5,162,798 A | * | 11/1992 | Yundt | 341/116 |
| 5,331,346 A | * | 7/1994 | Shields et al. | 348/441 |
| 5,374,683 A | | 12/1994 | Morser | 318/605 |
| 5,444,240 A | | 8/1995 | Nakayama | 250/237 |
| 5,463,393 A | | 10/1995 | Havlicsek | 341/115 |
| 5,721,546 A | * | 2/1998 | Tsutsumishita | 341/116 |
| 5,726,445 A | | 3/1998 | Thaler et al. | 250/237 |
| 5,805,090 A | * | 9/1998 | Sato | 341/116 |
| 5,814,812 A | | 9/1998 | Holzapfel | 250/231.16 |
| 5,930,067 A | * | 7/1999 | Andrews et al. | 360/77.04 |
| 6,232,594 B1 | | 5/2001 | Eccher et al. | 250/231.14 |
| 6,407,683 B1 | | 6/2002 | Dreibelbis | 341/111 |
| 6,556,153 B1 | * | 4/2003 | Cardamone | 341/111 |
| 6,639,529 B1 | * | 10/2003 | Jansson | 341/120 |
| 6,654,508 B1 | | 11/2003 | Markham | 382/291 |
| 6,686,585 B2 | | 2/2004 | Grimes et al. | 250/231.13 |
| 6,816,091 B1 | | 11/2004 | Chee | 341/13 |
| 6,897,435 B2 | | 5/2005 | Remillard et al. | 250/231.13 |
| 6,956,505 B2 | * | 10/2005 | Taniguchi et al. | 341/11 |
| 6,973,399 B1 | | 12/2005 | Burgschat et al. | 702/106 |

(Continued)

FOREIGN PATENT DOCUMENTS

| | | |
|---|---|---|
| EP | 1647810 A1 | 4/2006 |
| GB | 2335987 A | 10/1999 |

OTHER PUBLICATIONS

C. E. Shannon, "Communication in the presence of noise", Proc. Institute of Radio Engineers, vol. 37, No. 1, pp. 10-21, Jan. 1949. Reprint as classic paper in: Proc. IEEE, vol. 86, No. 2, (Feb. 1998).
Dr. Johannes Heidenhain Gmbh, "Encoders for Servo Drives", Nov. 2007, p. 25.
Renishaw plc, "Signum SR, Si encoder system", L-9517-9155-03-A, Jul. 2007.

(Continued)

*Primary Examiner* — Linh Nguyen
(74) *Attorney, Agent, or Firm* — Muirhead and Saturnelli, LLC

(57) ABSTRACT

A method is presented for converting the sine/cosine signals from an optical encoder into a high-resolution position signal for use by a position control system while eliminating common noise and error sources. The improved noise performance resulting from the alias-free demodulation of encoder signals improves precision and reduces power consumption in precision motion control applications. The adaptive compensation of harmonic distortion eliminates errors related to offset, gain and quadrature of the encoder channels. The interpolator is able to process encoder signals at extremely high resolution without the speed limitation of prior art encoder interpolators.

20 Claims, 12 Drawing Sheets

U.S. PATENT DOCUMENTS

| | | | |
|---|---|---|---|
| 7,262,714 B2 * | 8/2007 | Foo ................................ | 341/13 |
| 7,457,713 B2 * | 11/2008 | Finkler et al. .................... | 702/94 |
| 7,463,168 B2 * | 12/2008 | Rehmann et al. ................ | 341/11 |
| 2005/0162292 A1 * | 7/2005 | Kanekawa et al. ............ | 341/111 |
| 2006/0033643 A1 * | 2/2006 | Okamuro et al. .............. | 341/14 |
| 2006/0132338 A1 * | 6/2006 | Katakura et al. .............. | 341/112 |
| 2007/0288187 A1 | 12/2007 | Finkler et al. | |

OTHER PUBLICATIONS

MicroE Systems, "Mercury II 4000 Series", DS-Mercury II Rev. S14, 2006, p. 6.

Numerik Jena Gmbh, "RIK Rotary Encoder System Compact Model Range", RIK-D-e-09/06, 2006, p. 3-7.

* cited by examiner

State Estimator: Gain Approximation

Harmonic Error Analyzer Implementation with Bit Shifting

ENCODER INTERPOLATOR WITH ENHANCED PRECISION

RELATED APPLICATIONS

This application claims priority to U.S. Provisional App. No. 61/217,121, filed May 27, 2009, which is incorporated herein by reference.

TECHNICAL FIELD

This application is directed to the field of encoders and, more particularly, to an encoder interpolator with enhanced precision.

BACKGROUND OF THE INVENTION

Optical encoders are widely used for measuring the position of machine elements. They are commercially available in a range of configurations for measuring either rotary or linear motion. This invention relates to the subset of encoders that produce incremental analog output signals in quadrature. These are typically referred to as "1 volt peak-peak" or simply "analog" encoders. An alternate encoder format, commonly called "A-quad-B", produces a digital data stream rather than the analog voltage signals of analog encoders.

In reality, all high-resolution "digital" encoders are in fact analog encoders equipped with demodulators (or interpolators). The resulting demodulated encoder output is passed to an associated motion controller in a digital format.

Position information is encoded by an encoder as the phase of 2 analog signals in quadrature. A demodulator converts the phase of the analog signals to a position signal. In an incremental encoder, the analog signals repeat at a predetermined pitch. For instance, an incremental rotary encoder with 1024 lines per revolution will produce sinusoidal voltages that repeat every $2*\pi/1024$ radians (or equivalently: 360/1024 degrees) of rotation of the encoder shaft. The demodulator must keep track of the number of full cycles as well as the phase within the current cycle in order to properly deduce the absolute position of the encoder.

The well known technique for demodulating incremental encoder signals involves measuring the phase of the signals (using the arc-tangent operation) to determine current position within an encoder period and detecting when the encoder has crossed from one period to a subsequent period. A "coarse" count is incremented (or decremented) with each period-crossing while the phase information is used to determine the current fraction of a period. The result might, for example, be represented as a fixed precision digital word within a computer or digital signal processor (DSP). With a 32-bit digital representation of position, the processor might use the lower 12 bits to represent the fraction of a period (derived directly from the phase of the encoder signals) while the upper 20-bits would be used to maintain the current count of complete periods. Such a representation would provide resolution of $period/(2^{12})$. For a hypothetical 1024 line rotary encoder, the resolution would be $2*\pi/(1024*4096)$ radians or approximately 1.5 micro radian resolution of shaft position.

It is well known that optical encoders exhibit cyclical errors (i.e. errors that substantially repeat from one period to the next). Cyclical errors are caused by offsets present in the analog encoder signals as well as relative gain and quadrature errors. Note that since the arctangent function is used to convert phase to position and since the arctangent function involves the ratio of sine and cosine voltages, only the relative gain error between the sine and cosine voltages is significant. The quadrature error causes the sine signal to be shifted slightly more or less than $\pi/2$ radians (90°) with respect to the cosine channel. The error sources produce cyclical errors in the conversion from phase to position. The result is an error signal superimposed upon the true position that can be described by the Fourier coefficients of the $1^{st}$ and $2^{nd}$ harmonic of the encoder period:

Indicated_position=True_position+$A1*\cos(\theta)+B1*\sin(\theta)+A2*\cos(2*\theta)+B2*\sin(2*\theta)$;

where: $\theta$ is the nominal phase of the encoder signals (ie: $\theta$=arctangent(sine/cosine)).

Consider a 1024 line rotary encoder rotating at 1000 rpm. The $1^{st}$ and $2^{nd}$ harmonics of the encoder will occur at 17067 and 34133 Hertz. If the encoder is used as the feedback device to control the motor speed, then the motion controller will sample the encoder output at a periodic rate (sample rate) determined by the controller. A typical sample rate might be 2000 Hertz (2 kHz).

A well known property of all sampled data systems is referred to as the Nyquist-Shannon sampling theorem (C. E. Shannon, "Communication in the presence of noise"). The theorem states that if a signal lies in the frequency interval between 0 and ½ the sampling frequency, then the signal can be completely reconstructed from its samples. One-half the sampling frequency is called the Nyquist frequency. A side effect of the sampling theorem is that frequencies outside the range {DC:Nyquist} will alias into the range when sampled. That is, a signal occurring at a much higher frequency than the Nyquist frequency will re-appear, after sampling, somewhere within the range of {DC:Nyquist}. This effect is called aliasing.

In the example above of a 1024 line encoder running at 1000 rpm, the $1^{st}$ and $2^{nd}$ harmonics lie well above the range {DC:1000} Hertz. As a result, the error terms will be aliased and will reappear within the range {DC:1000} Hertz. After aliasing, the encoder errors will appear at 933 and 133 Hertz. If the servo loop bandwidth is in the range of 100 Hertz (a reasonable value for a precision machine spindle, for example), then the servo loop will respond to the 133 Hertz error term, but respond negligibly to the 933 Hertz component. This will create vibration within the motor and structure to which it is attached. It will also produce unnecessary heat in the motor as it tries to compensate for what appears to be servo error, but in fact is false data produced by the encoder at a very high frequency, but aliased into a frequency range where the machine is sensitive. Continuing with this example, if the speed increased by 1% to 1010 rpm, the errors occurring at the $1^{st}$ and $2^{nd}$ harmonics of the encoder will originate at 17,237 and 34,475 Hertz but be aliased to 763 and 475 Hertz. For the same servo bandwidth, the motor may produce an audible hum at the 475 Hertz, but produce less shaking of the structure due to the diminished capability of the 100 Hertz servo loop bandwidth to compensate for a higher frequency error signal.

If the motor slows down 0.5% to 995 rpm, the error terms originate at 16,981 and 33,963 Hertz but alias to 981 and 37 Hertz. At 37 Hertz, the servo loop will have considerable gain with which to attempt to correct for the perceived error. The result may be significant noise, vibration and wasted power in the motor all of which are detrimental to precision motion applications.

The well known solution to avoid aliasing with sampled data systems is to filter the signal in the analog domain at below one-half the sampling rate. This ensures that the signal being sampled complies with the Nyquist-Shannon sampling theorem by attenuating frequencies above the Nyquist frequency.

Unfortunately, this is impractical in the case of encoders. For a 2000 Hertz servo sampling rate, the encoder signals would have to be filtered with analog low-pass filters at below 1000 Hertz. For a 1024 line encoder, the maximum speed would be limited to less than 60 rpm.

The problem stems from the fact that encoders are "wideband" sensors and therefore must not be filtered at low frequencies. Yet, the true signal of interest (the position of a machine slide or motor shaft, for instance) is a much lower bandwidth signal (hence the much lower sampling rate of the motion controller). What is needed is an improved way of extracting the low frequency position information about the machine that is encoded in the high-frequency encoder signals.

There are other sources of error affecting motion control systems that employ encoders. A common problem is the use of switching amplifiers to drive large motors. Switching amplifiers are the predominant amplifier for driving servo motors within industry. They are smaller and far more efficient than linear amplifiers. However, they are notorious for radiating electrical noise over a broad spectrum. Since the encoder is often located in close proximity to the motor (usually directly attached to the motor), the encoder may pick up some of the noise radiated from the amplifier as it drives the motor. Typical switching amplifiers radiate electrical noise in the range of 10,000 to 100,000 Hertz. Noise at such high frequencies would not normally affect a typical motion control system. However, if the noise is picked up by the encoder read head, it will affect the resulting position signal. The error signal will be aliased into the range from {DC:Nyquist} (or {DC:1000} Hertz in the example case). Certain frequencies may create significant problems for the servo system whereas other frequencies will have no effect at all.

The problem revealed in these examples is that the encoder signal is aliased by the sampling rate of the motion control system. Error frequencies that originate at (harmless) high frequencies are aliased by the motion controller sampling process and re-appear within the limited frequency band between DC and ½ the sampling frequency. Small changes in the source frequency (due to changing speed of the encoder, for instance) can turn a harmless error source into a significant error problem.

Offsets in the signal channels of the encoder cause errors that occur at the $1^{st}$ harmonic of the encoder frequency (once per encoder period). Errors in the gain of one channel relative to the other cause a $2^{nd}$ harmonic error (twice per encoder period). If the sine channel is not exactly orthogonal to the cosine channel, an error (quadrature error) will also be produced at the $2^{nd}$ harmonic. Typical encoders may exhibit error amplitudes caused by offset, gain and quadrature imperfections of approximately 1% to 2% of the encoder period ("Encoders for Servo Drives" pg 25; "Signum SR, Si encoder system" pg 1; "Mercury II 4000 Series" pg 6). Prior art methods of reducing harmonic errors involve manipulating the grating period (U.S. Pat. Nos. 5,726,445 and 5,814,812) during grating manufacturer or by analyzing the variation in signal magnitude as a function of phase angle (U.S. Pat. Nos. 5,134,404 and 6,897,435). Another method disclosed in U.S. Pat. No. 6,956,505 is to compare the measured position with a running average estimated position when the machine axis is moving at constant speed in order to detect cyclical errors.

In some encoders, the corrections are determined during an initial setup operation or when the encoder makes an initial movement (Renishaw Signum; MicroE Mercury II; Numerik Jena RIK). The corrections are stored and applied as constant corrections for all subsequent motions. In some high precision applications, there is a need to reduce the $1^{st}$ and $2^{nd}$ harmonic errors even further. Also, many encoders exhibit a variation in the offset, gain and quadrature imperfections as a function of axis position. Correcting these imperfections requires adaptive compensation that can respond to encoder imperfections under normal operating conditions of the encoder. Another limitation of prior art encoder interpolators is a tradeoff between speed and resolution (Renishaw SR, pg 3; MicroE Mercury II, pg 5; Numerik Jena RIK, pg 7). Prior art method of demodulating quadrature signals requires sampling the encoder signals a minimum of four times per cycle. With four samples per cycle, it is possible to always determine the proper number of complete cycles. It is also possible to detect when an axis is moving faster than the maximum rated speed and thereby flag an error condition. The error condition can indicate to the motion controller that the encoder count is no longer reliable and that the machine axis should be shutdown.

The requirement to sample at least four times per encoder cycle leads to a tradeoff between speed, resolution and cost. A high resolution analog to digital converter (ADC) is needed to provide high resolution interpolation of analog encoder signals. However, a high-resolution ADC is more expensive and cannot sample at as high a sample rate as a low resolution ADC. Alternatively, a high-resolution, high-speed ADC can be selected, but will cost far more than a high-speed low resolution ADC.

Accordingly, it would be desirable to demodulate and interpolate encoder signals without aliasing high-frequency error sources while adaptively compensating for $1^{st}$ and $2^{nd}$ order encoder errors and to do so at high-resolution, high speed and moderate cost.

SUMMARY OF THE INVENTION

An encoder interpolator with enhanced precision incorporates a state estimator to demodulate and interpolate encoder signals. In various embodiments, the interpolator may be implemented as an application specific integrated circuit (ASIC), digital signal processor (DSP) or field programmable gate array (FPGA). The sample rate of the state estimator is selected to be significantly faster than the highest frequency of the encoder to be processed.

A state estimator may incorporate a simplified model of the dynamics of the machine axis. The output of the estimator is taken as the position of the axis. The position encoded in the signals from the read head are compared with the estimated position. The difference ("estimated error") drives the states of the estimator through gains that are predetermined to achieve a desired bandwidth.

The bandwidth limited output of the state estimator attenuates high frequency noise and error sources that may be present in the unprocessed (raw) outputs of the encoder read head. By selecting a sufficiently high sample frequency for the state estimator, the Nyquist frequency is higher than the analog bandwidth of the read head. As a result of the high Nyquist frequency, the resulting estimator output does not contain aliased images of high frequency noise sources.

The estimated error (the difference between raw encoder position and estimated position) provides a signal that can be used to determine compensation for signal offsets, relative gain and quadrature errors. An adaptive compensation circuit implements a Fourier transform of the $1^{st}$ and $2^{nd}$ harmonics of the estimator error. The resulting Fourier coefficients are the desired corrections that are applied to the raw encoder signals in a feedback loop that drives the selected harmonics of encoder error to zero.

The state estimator allows a high resolution interpolation to be achieved without compromising speed. The resolution of the interpolator is determined by the resolution of the analog to digital converter (ADC) used to digitize the raw encoder signals as well as the ratio between the sample rate of the state estimator and the bandwidth of the state estimator. With typical "over sampling ratios" of 50,000:1 (10 MHz/2 kHz), there is approximately a 70 fold (square root of 50,000) increase in resolution at the output of the interpolator compared to the resolution of the ADC. For a desired level of resolution, a lower resolution, lower cost ADC may be used compared to prior art interpolators.

The state estimator allows an unambiguous determination of the position of an incremental encoder without requiring multiple samples per encoder period. The maximum speed of an axis is limited by attenuation of the raw encoder signals within the read head electronics or by some other limitation of the machine axis unrelated to the encoder. The state estimator is capable of producing error-free position estimates with less than 1 sample per encoder period.

According to the system described herein, an encoder interpolator includes a state estimator that demodulates and interpolates received encoder signals, where a sample rate of the state estimator is faster than a highest frequency of an encoder being processed, and where the state estimator determines an estimated position being monitored by the encoder being processed and compares the estimated position with an encoded position that is encoded in the received encoder signals, the difference thereof being an estimated error, and where the state estimator outputs the estimated position and the estimated error. The encoder interpolator also includes a circuit that receives from the state estimator the estimated position and the estimated error and determines update information that is used to modify the encoder signals that are received by the state estimator. The estimated error may drive states of the state estimator through gains that are predetermined to achieve a desired bandwidth. The encoder interpolator may be implemented as an application specific integrated circuit (ASIC), a digital signal processor (DSP) and/or a field programmable gate array (FPGA). The sample rate may be set higher than an analog bandwidth of a read head of the encoder. The update information may provide compensation for signal offsets, relative gain and/or quadrature errors. The circuit may be an adaptive compensation circuit that implements a Fourier transform of $1^{st}$ and $2^{nd}$ harmonics of the estimator error. Resulting Fourier coefficients of the Fourier transform may be the update information that is applied to the encoder signals in a feedback loop that drives selected harmonics of encoder error to zero. The encoder interpolator may also include an analog to digital converter (ADC) that digitizes the received encoder signals. The state estimator may further determine an estimated velocity and an estimated acceleration.

According further to the system described herein, providing encoder interpolation includes demodulating and interpolating received encoder signals, where a sample rate of the demodulating and interpolating is faster than a highest frequency of an encoder being processed, determining an estimated position being monitored by the encoder being processed, comparing the estimated position with an encoded position that is encoded in the received encoder signals, the difference thereof being an estimated error, outputting the estimated position and the estimated error, and determining update information using the estimated position and the estimated error using the update information to modify the received encoder signals prior to the demodulating and interpolating. The update information may provide compensation for signal offsets, relative gain and/or quadrature errors. Providing encoder interpolation may also include implementing a Fourier transform of $1^{st}$ and $2^{nd}$ harmonics of the estimator error. Resulting Fourier coefficients of the Fourier transform may be the update information that is applied to the encoder signals in a feedback loop that drives selected harmonics of encoder error to zero. Providing encoder interpolation may also include digitizing the encoder signals. Providing encoder interpolation may also include determining an estimated velocity and an estimated acceleration.

According further to the system described herein, a computer readable storage medium stories computer software that provides encoder interpolation. The computer software includes executable code that demodulates and interpolates received encoder signals, where a sample rate of the demodulating and interpolating is faster than a highest frequency of an encoder being processed, executable code that determines an estimated position being monitored by the encoder being processed, executable code that compares the estimated position with an encoded position that is encoded in the received encoder signals, the difference thereof being an estimated error, executable code that outputs the estimated position and the estimated error, executable code that determines update information using the estimated position and the estimated error, and executable code that uses the update information to modify the received encoder signals prior to the demodulating and interpolating. The update information may provide compensation for at least one of: signal offsets, relative gain and quadrature errors. The computer readable storage medium may also include executable code that implements a Fourier transform of $1^{st}$ and $2^{nd}$ harmonics of the estimator error. Resulting Fourier coefficients of the Fourier transform may be the update information that is applied to the encoder signals in a feedback loop that drives selected harmonics of encoder error to zero. The computer readable storage medium may also include executable code that determines an estimated velocity and an estimated acceleration.

BRIEF DESCRIPTION OF THE DRAWINGS

Embodiments of the system are described with reference to the several FIG.s of the drawings, briefly described as follows.

DETAILED DESCRIPTION OF VARIOUS EMBODIMENTS

Figure 1:
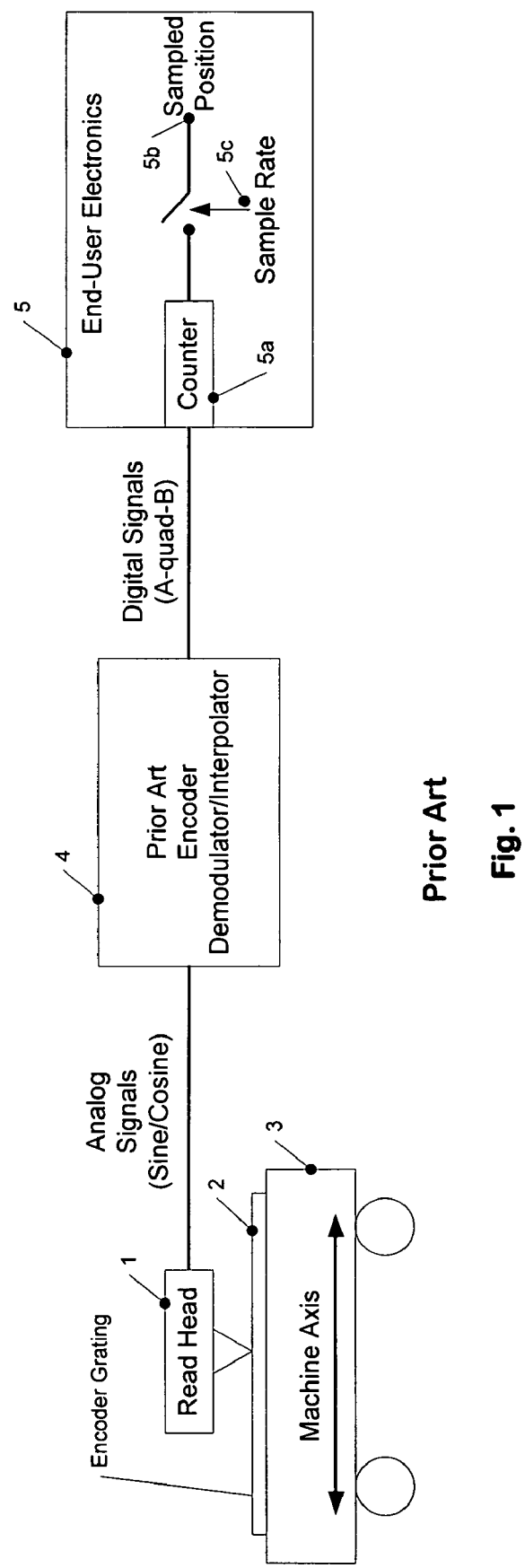
FIG. 1 is a block diagram of a prior art encoder, demodulator and interpolator and end-user electronics.

FIG. 1 is a block diagram of a system that incorporates an analog encoder consisting of read head 1 and grating 2 mounted on machine axis 3, prior art encoder demodulator/interpolator 4 and end-user electronics 5. The end-user electronics 5 includes a counter 5a that counts the digital pulses produced by the encoder interpolator 4. The counter output is sampled at a fixed rate 5c to produce a sampled position signal 5b that is used by the end-user electronics.

Figure 2:
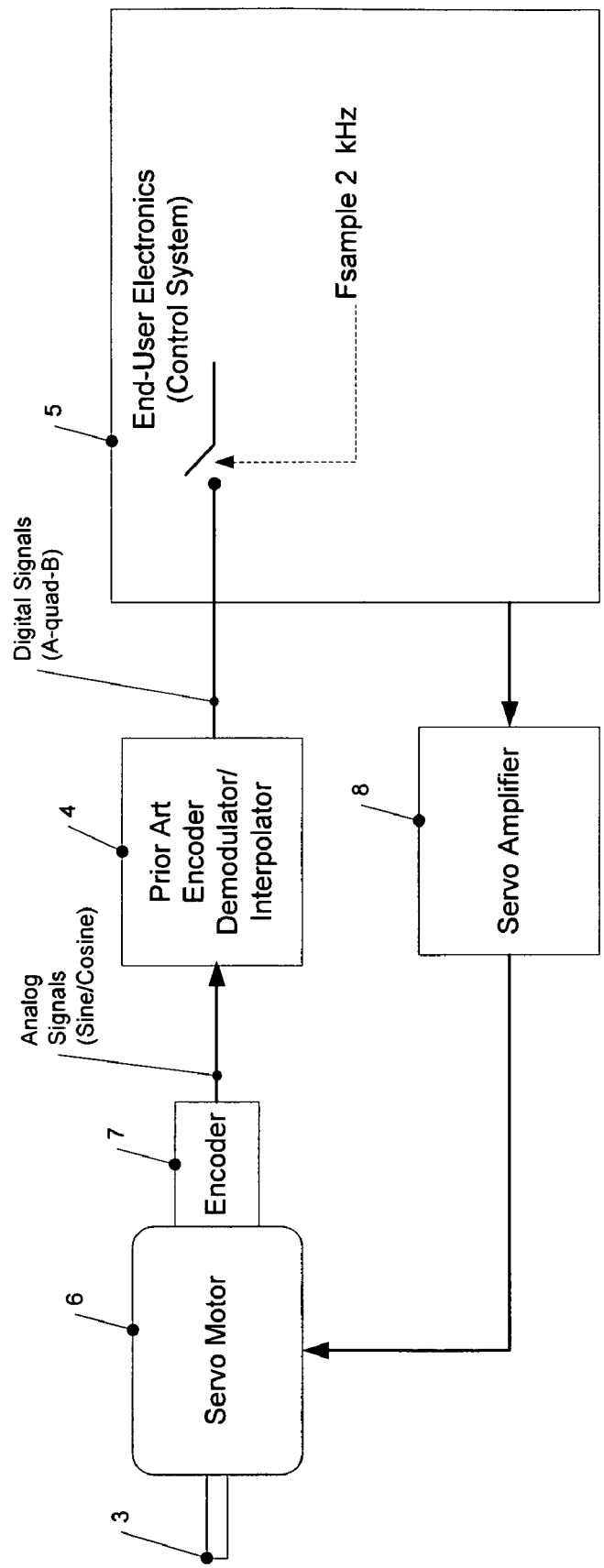
FIG. 2 is a block diagram of a motion control system that includes a prior art encoder demodulator and interpolator.

FIG. 2 is a block diagram of a machine control system that includes similar elements as shown in FIG. 1. The end-user electronics 5 implements a control system to control a servo motor 6 that is connected to a machine axis 3. A rotary encoder 7 attached to the motor provides analog signals to a prior art encoder demodulator/interpolator 4. The digital signals from the interpolator are sampled by the end-user electronics 5 at a fixed sample rate.

Figure 3:
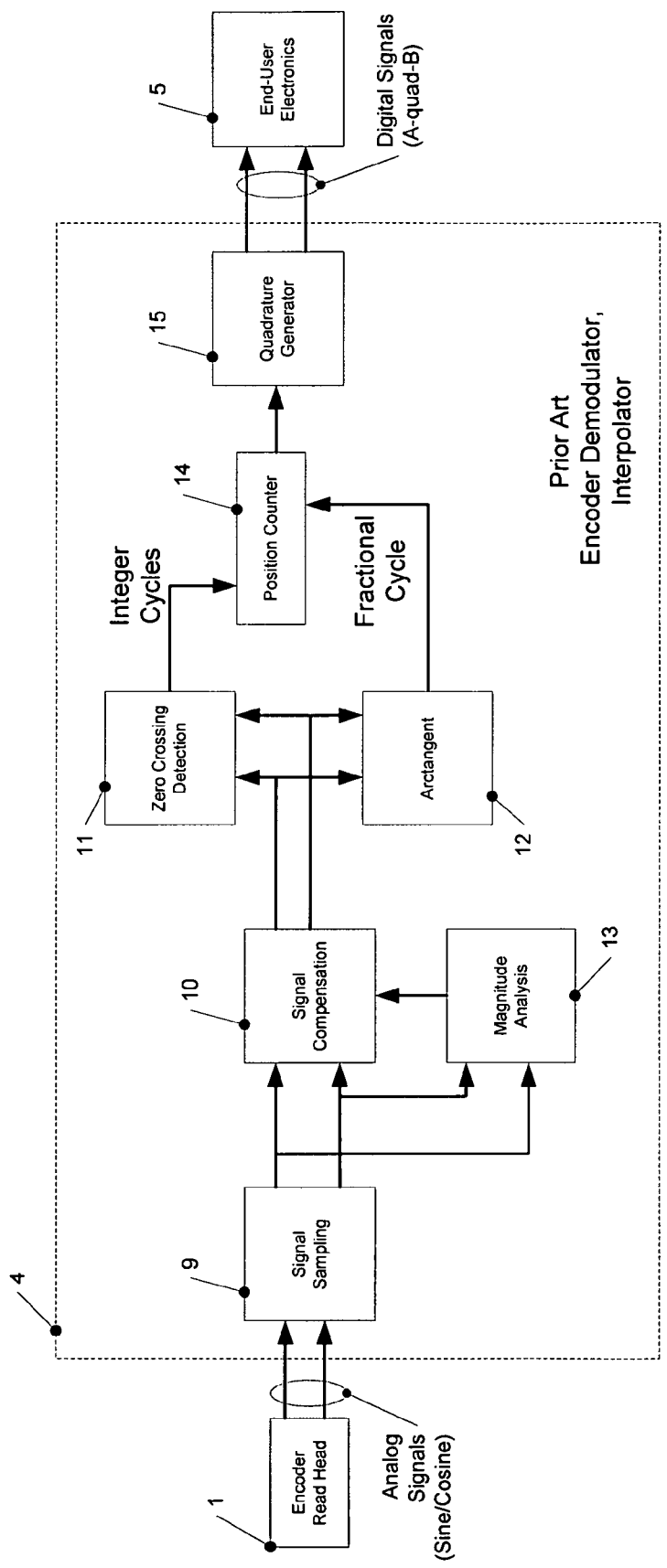
FIG. 3 is a block diagram of a prior art encoder demodulator and interpolator.

FIG. 3 is a block diagram of a prior art demodulator/interpolator. Analog signals to from encoder read head 1 are sampled in signal sampling block 9. The digitized encoder signals are compensated for offset, gain and quadrature in signal compensation block 10. The phase within one encoder cycle is determined by taking arctangent 12 of the sine and cosine signals. Arctangent 12 of the encoder signals supplies the fractional portion of position counter 14. Zero crossing detector 11 increments or decrements the integer portion of position counter 14. Quadrature generator 15 provides two digital output signals in quadrature in response to the position counter 14. The digital quadrature signals are sampled by end-user electronics 5.

Figure 4:
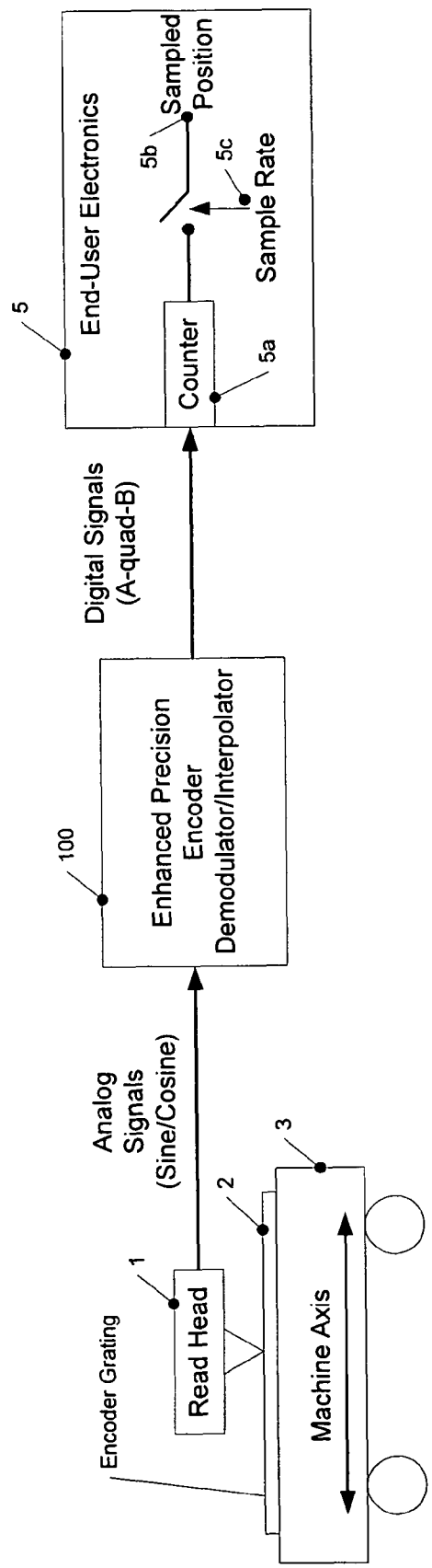
FIG. 4 is a block diagram of a system that incorporates an enhanced precision encoder demodulator and interpolator according to an embodiment of the system described herein.

FIG. 4 is a block diagram of a system that incorporates an enhanced precision encoder interpolator 100. The system shown in FIG. 4 may be similar to that shown in FIG. 1 but with the further addition of the interpolator 100.

Figure 5:
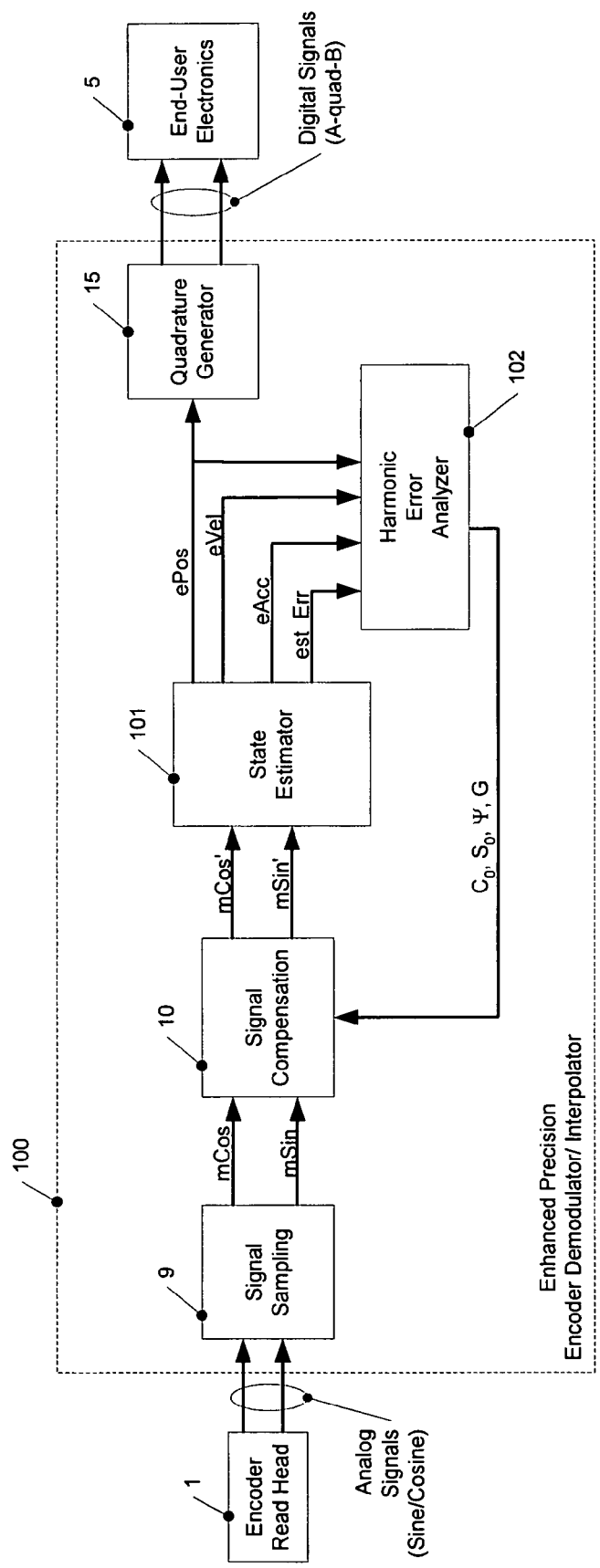
FIG. 5 is a block diagram showing an enhanced precision encoder demodulator and interpolator according to an embodiment of the system described herein.

FIG. 5 is a block diagram of the enhanced precision encoder interpolator 100. Analog signals from encoder read head 1 are sampled by signal sampling block 9 and compensated by signal compensation block 10. The digitized and compensated encoder signals are processed in state estimator 101. The state estimator 101 provides estimates of position, velocity, acceleration and estimator error. The estimated position output is used in quadrature generator 15 to produce digital quadrature outputs that are sampled by end-user electronics 5.

The four outputs of the state estimator are used in harmonic error analyzer 102 to determine the compensation signals ($C_0$, $S_0$, $\Psi$, G) that are used to compensate the uncorrected encoder signals (mCos, mSin) to produce compensated signals (mCos', mSin') in signal compensation block 10. Signal sampling 9, signal compensation 10 and quadrature generator 15 are substantially similar to prior art (signal sampling: U.S. Pat. No. 6,556,153, col 4, line 6; signal compensation: U.S. Pat. No. 6,897,435 col. 2, line 10; U.S. Pat. No. 5,134,404 col. 5, line 10 and quadrature generator: U.S. Pat. No. 6,897,435 col. 9, line 28). The demodulation of compensated encoder signals in the state estimator 101 and the analysis of the estimated error signal in the harmonic error analyzer 102 provide the novel and beneficial aspects of the enhanced encoder interpolator 100 over prior art encoder interpolator 4.

Figure 6:
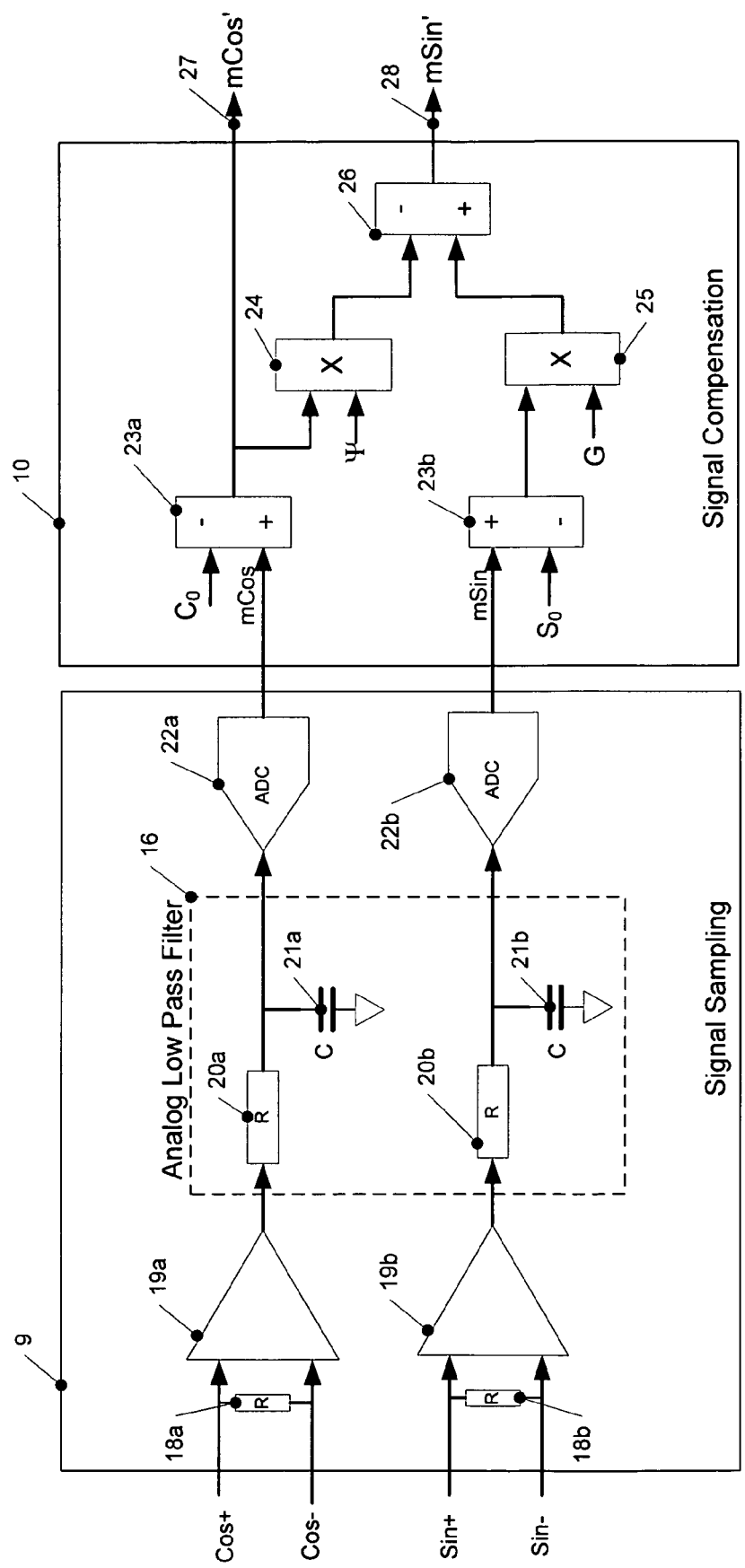
FIG. 6 is a block diagram showing signal sampling and signal compensation functions that may be used in connection with the enhanced precision encoder demodulator and interpolator according to an embodiment of the system described herein.

FIG. 6 is a block diagram of the signal sampling 9 and signal compensation 10 functions that may be used in connection with the enhanced encoder interpolator 100 according to an embodiment of the system described herein. Analog encoder signals from read head 1 are typically transmitted as differential signal pairs. Differential signals Cos+ and Cos− are terminated by line termination resistor 18a at the input of differential amplifier 19a. Differential signals Sin+ and Sin− are terminated by resistor 18b and differential amplifier 19b. The cosine and sine signals are filtered by analog low pass filter 16. Resistor 20a and capacitor 21a form a single-pole low pass filter for the cosine signal. Resistor 10b and capacitor 21b form a single-pole low-pass filter for the sine signal. In some situations, analog low pass filter 16 may be implemented within the encoder read head and therefore removed from the signal sampling section 9. In most situations, the analog low pass filter bandwidth will be set to a value less than 1 MHz. The filter bandwidth should be set a factor of two or three times higher than the maximum encoder signal frequency based on the maximum expected speed of the machine axis and the encoder line resolution. For example, a 1024 line rotary encoder attached to a machine axis that is expected to operate at 15,000 rpm will have a maximum signal frequency of 256 kHz. The low pass filter frequency should be set between 500 kHz and 750 kHz. A resistor (20a, 20b) value of 35.7 ohm and capacitor (21a, 21b) value of 6800 pF will provide a low pass filter frequency of 656 kHz.

Analog to digital converters (ADC) 22a and 22b sample the encoder signals to produce digitized raw uncompensated encoder signals mCos and mSin. ADC converters 22a and 22b convert the analog signals at a rate that is well above the analog low pass filter bandwidth. A sample rate of 10 Mhz, for example, is well above typical filter bandwidths of 1 Mhz and within the range of moderate cost analog to digital converters. The resolution of the converter is typically selected between 8 and 14 bits. A lower resolution ADC will be less expensive and still provide good resolution for most applications. A converter with more bits will provide more resolution at higher cost. There is little cost advantage in selecting converters with less than 8 bits resolution. A 14 bit ADC provides resolution comparable to the noise floor of most encoders thereby setting a practical upper limit on ADC resolution.

Summers 23a and 23b remove offsets $C_0$ and $S_0$ from mCos and mSin respectively. The output of summer 23a is compensated signal mCos' 27. The gain of the sine signal relative to the cosine signal is corrected by gain G in multiplier 25. The quadrature of the sine signal relative to the cosine signal is corrected by angle $\Psi$ using multiplier 24 and summer 26. The result is compensated signal mSin' 28.

Figure 7:
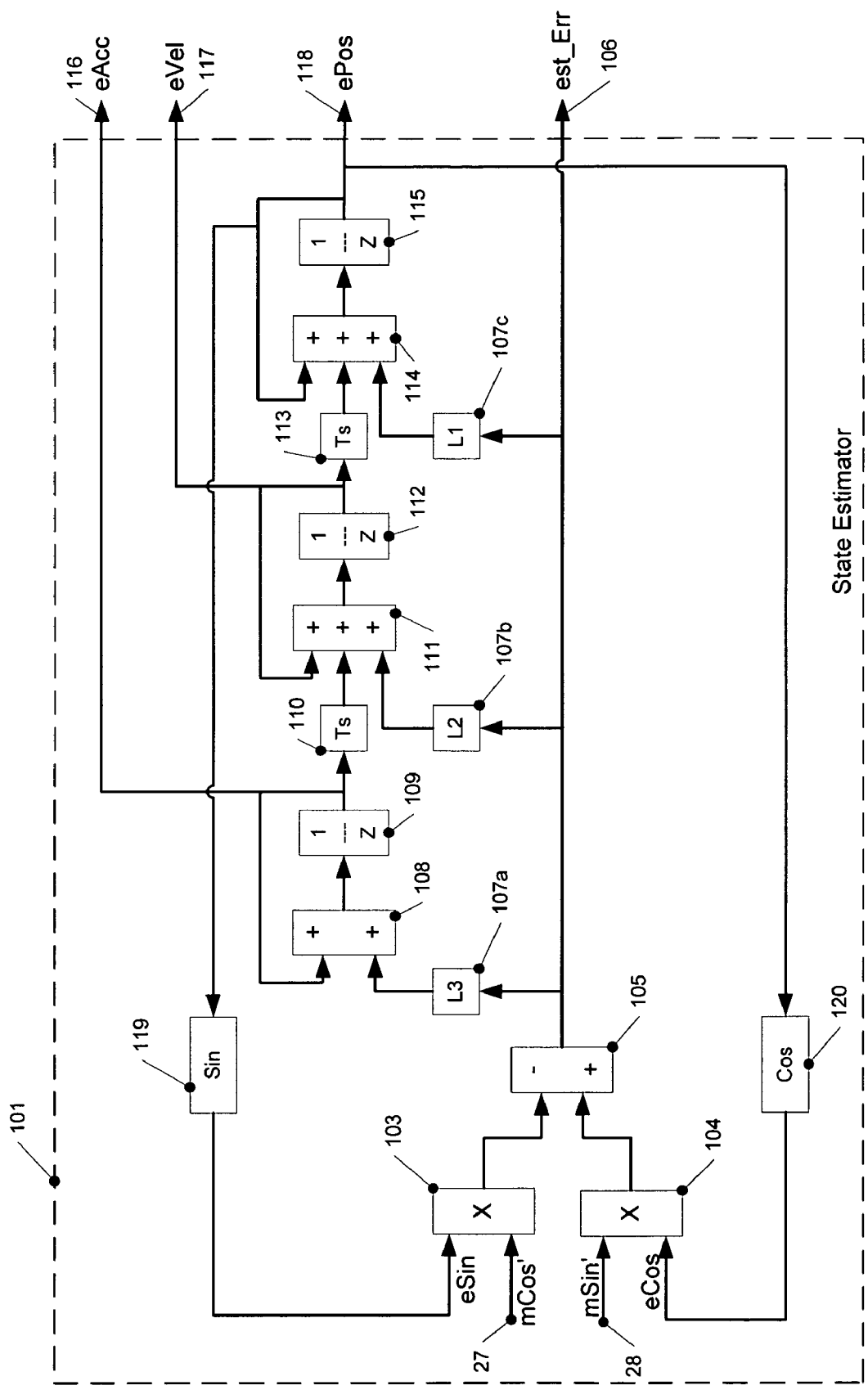
FIG. 7 is a block diagram showing an embodiment of a $3^{rd}$ order state estimator according to an embodiment of the system described herein.

FIG. 7 is a block diagram of state estimator 101. State estimator 101 incorporates a model of the physical system. The model is used to estimate one time step forward in time.

The estimated position of the encoder is compared with the actual digitized sine and cosine signals (mCos' and mSin') and the resulting difference is used to drive the next state estimate. Note that it is the difference between the estimated position and the actual measured position that drives the update to the estimator. This observation is used to demodulate the sine and cosine signals.

Since it is only the difference between estimated and measured positions, only the difference between the actual phase of the encoder signals and the current estimated position (or equivalently, phase) must be determined.

Under normal operation, the difference between the estimated and measured phase of the encoder will be a very small fraction of a single encoder line (typically well under 0.001*encoder pitch). Under these conditions, the difference between two phase angles can be approximated by the sine of the difference:

(measured_phase−est_phase)=sin(measured_phase−est_phase)

The following trigonometric identity is used to approximate the phase difference:

Sin(a−b)=sin(a)*cos(b)−cos(a)*sin(b)

Referring to FIG. 7, compensated signals mCos' 27 and mSin' 28 are combined with estimated cosine and sine signals eCos and eSin that are derived from estimated position signal ePos using cosine block 120 and sine block 119. Summer 105 forms estimated error signal est_Err 106.

Est_Err 106 drives estimated position (ePos 118) to converge upon the measured position (mCos, mSin) at a rate determined by gains L1 107*c*, L2 107*b* and L3 107*a*.

The choice of gains, which determines the bandwidth of the state estimator, is based upon knowledge of the expected frequency range of disturbances that are likely to affect the device that is being measured. For most machine axes, the frequency of disturbance signals lies well below 2 kHz. A reasonable bandwidth for the state estimator is therefore 2 kHz. In other circumstances, other bandwidths may be warranted. Selecting a lower bandwidth for the state estimator will provide more noise attenuation and slightly higher resolution at the risk of attenuating relevant machine dynamics. Selecting a higher estimator bandwidth will capture more high frequency machine dynamics as well as more noise. If the estimator bandwidth is more than ½ of the sample rate of the end-user electronics, then there will be some aliasing of position data within the end-user electronics, though much reduced compared to prior art encoders as a result of the filtering action of the state estimator. Those skilled in the art will know how to configure estimator gains L1, L2, L3 to achieve a desired bandwidth. In a preferred embodiment, gains L1, L2 and L3 are set as follows:

$L1=2.5*wn*Ts,$ $L2=3.0*wn^2*Ts,$ $L3=1.0*wn^3*Ts$

Where wn=2*pi*$F_0$; and $F_0$ is the desired estimator bandwidth (2 kHz for example), and Ts is the sample period (0.1 μseconds for a 10 Mhz sample rate, for example).

Summer 108 and unit delay 109 together form a discrete time implementation of an integrator. The output of unit delay 109 is an estimate of the acceleration of the encoder eAcc 116. The output of unit delay 109 is scaled by the sample period Ts in gain 110 and combined in summer 111 with the output of unit delay 112 to produce estimated velocity eVel 117. Estimated velocity is affected by estimated error 106 though gain L2 107*b*. Estimated velocity 117 is scaled by the sample period Ts in gain block 113 and combined in summer 114 with the output of unit delay 115 to produce estimated position ePos 118. Estimated position is affected by estimated error through gain L1 107*c*.

Figure 8:
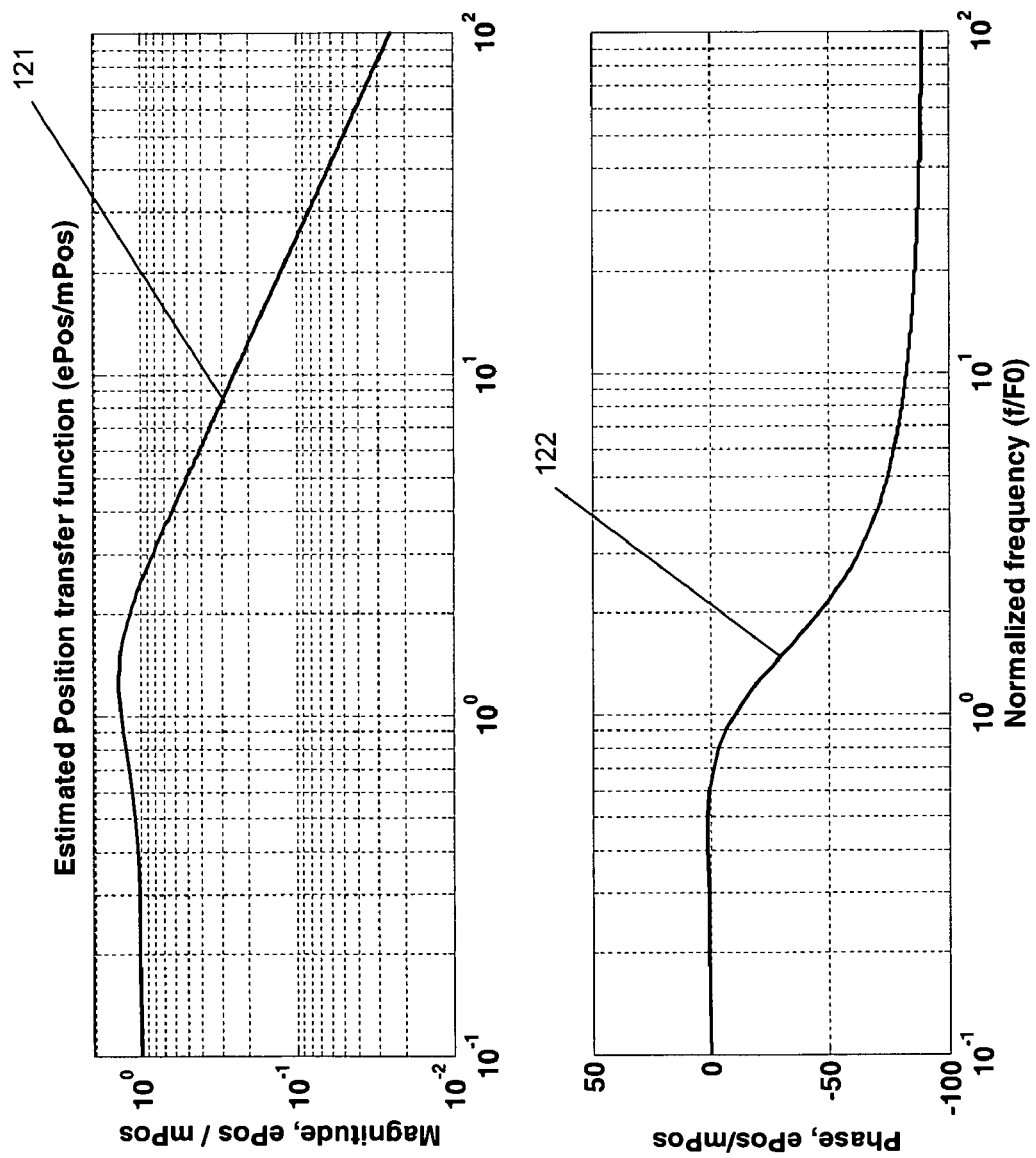
FIG. 8 is a Bode plot showing the magnitude and phase response of estimated position to measured position as a function of normalized frequency according to an embodiment of the system described herein.

The estimator gains L1, L2, L3 determine the response of the state estimator to encoder position. FIG. 8 is a Bode plot of the response of estimated position (ePos 118) to measured position (mPos) as a function of normalized frequency. Normalized frequency is actual frequency divided by the nominal bandwidth of the state estimator $F_0$ (2 kHz for example). Note that mPos is not immediately available as a signal in FIG. 7. However, the dynamics of the state estimator are determined by the three integrators and associated feedback gains. The transformation of estimated position to eCos and eSin and the subsequent combination with mCos' and mSin' to produce estimated error does not affect the dynamics of the state estimator. Therefore, one can study the dynamics of the estimator by replacing mCos' and mSin' by the imaginary signal mPos and using summer 105 to form estimated error 106 directly as est_Err=mPos−ePos. The magnitude plot 121 of FIG. 8 shows nearly flat response for frequencies below the estimator bandwidth and a first-order attenuation of response to frequencies above the estimator bandwidth. The phase plot 122 shows in-phase response at frequencies below estimator bandwidth and 90° of phase shift at high frequencies. Note that ePos does not respond to mPos at frequencies much above the selected target frequency. Thus, noise that appears on the encoder signals above the estimator bandwidth will be attenuated before it is passed to the control system.

It is important to understand that the estimator filters the estimated state of the machine position, not the encoder signals. Filtering of the state does not restrict the speed of the machine axis whereas filtering the encoder signals severely restricts the maximum speed of the machine.

The resulting, bandwidth limited, position information is passed to the motion controller. Since the sampling and state estimation are performed at a sample frequency well above the analog signal bandwidth, the resulting position information is guaranteed to be free of aliased error sources. The result is much reduced noise, vibration and heat dissipated in the motor since it is not subjected to "false" error sources. A further advantage is an increase in the immunity of the servo system to external noise sources such as radiated noise from switching amplifiers. As long as the digital sampling and state estimation occur at a rate well above the analog low-pass filter bandwidth, then it is possible to produce bandwidth-limited position information for use by the servo controller that is free of aliased error sources.

A $3^{rd}$ order state estimator is used in a preferred embodiment. The $3^{rd}$ order estimator produces zero estimator error under static (zero velocity), constant velocity and constant acceleration conditions. The estimator produces band-limited estimates for position, velocity and acceleration.

The state estimator alone does not eliminate $1^{st}$ and $2^{nd}$ order harmonic errors caused by offset, gain and quadrature errors in the encoder signal channels. At low speeds, these errors will still cause positioning errors. $1^{st}$ order errors can be corrected by applying an offset to each signal path. $2^{nd}$ order errors are corrected by adjusting the gain and phase of one channel with respect to the other.

Figure 9:
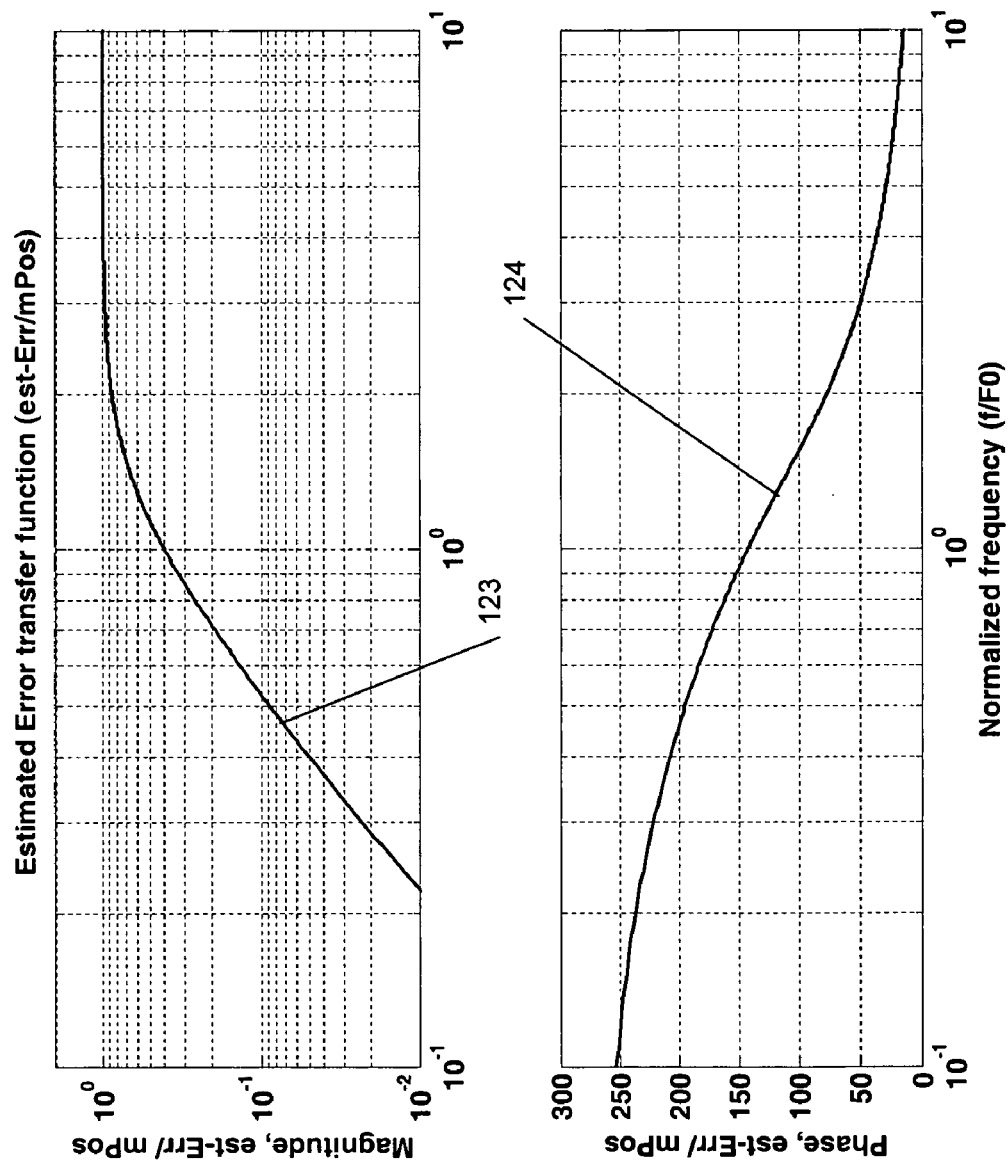
FIG. 9 is a Bode plot showing the magnitude and phase response of estimated error to measured position as a function of normalized frequency according to an embodiment of the system described herein.

The $1^{st}$ and $2^{nd}$ order corrections are found by analyzing estimator error (est_Err") in the harmonic error analyzer 102. Estimator error is the difference between the measured position and the estimated position of the encoder. The state estimator includes a simplified model of the machine dynamics that does not include encoder errors. Encoder errors will propagate to estimator error based on the transfer function of the state estimator. FIG. 9 is a Bode plot of the response of estimated error (est_Err 106) to measured position (mPos). The magnitude and phase of the response is plotted against normalized frequency $F_0$. Note that at frequencies greater than the estimator bandwidth the magnitude of the error transfer function approaches unity (10°) and the phase approaches 0 degrees. At lower frequencies, the amplitude is reduced and the phase shifts with the largest shifts at the lowest speeds. As an example, a 1024 line rotary encoder rotating at 1200 rpm will produce $1^{st}$ order errors at 20.48 kHz and $2^{nd}$ order errors at 40.96 kHz. Since these frequencies are well beyond the 2 kHz bandwidth of the state estimator, they will be attenuated by the estimator (Bode plot of FIG. 8) and will produce negligible error in the resulting position signal. However, the magnitude and phase of the encoder errors can be readily determined by analyzing the $1^{st}$ and $2^{nd}$ harmonics of the estimator error (Bode plot of FIG. 9).

At 30 rpm, a 1024 line encoder will produce $1^{st}$ and $2^{nd}$ harmonic errors at 0.512 kHz and 1.024 kHz. These frequencies lie below the estimator bandwidth and therefore the encoder errors will be present in the position signal if the encoder is not compensated. The estimator error signal will show the $1^{st}$ and $2^{nd}$ harmonic errors at reduced amplitude and shifted in phase.

The four encoder errors (cosine offset, sine offset, relative gain of the cosine channel and quadrature of the sine channel relative to the cosine channel) correlate to the first two harmonics of observer error. Consider the expression for encoder output:

Indicated_position=True_position+$A1$*cos(phi)+ $B1$*sin(phi)+$A2$*cos(2*phi)+$B2$*sin(2*phi);

As estimated position (ePos) converges upon True_position, then estimator error (est_Err) will converge to:

Est_Err=mPos–ePos=Indicated_position– True_position=$A1$*cos(phi)+$B1$*sin(phi)+$A2$*cos (2*phi)+$B2$*sin(2*phi);

It is possible to determine the A and B coefficients by taking the first two terms of the Fourier transform of estimated error. The coefficients of the $1^{st}$ and $2^{nd}$ harmonics relate to encoder errors as follows:

Cosine offset($C_0$)–>–sin(theta) or (–$B1$);

Sine offset($S_0$)–>cos(theta) or $A1$;

Relative Gain($G$)–>sin(2*theta) or $B2$

Quadrature($\Psi$)–>cos(2*theta) or $A2$

For instance, a DC offset of the cosine channel will cause an observer error that is in-phase with the sine signal. Likewise, if the sine channel is not quite orthogonal to the cosine channel, an observer error will be present that is in phase with the cosine of the $2^{nd}$ harmonic of the encoder.

Harmonic error analyzer (FIG. 10) performs adaptive compensation. The compensation operation multiplies the observer error by $1^{st}$ and $2^{nd}$ order cosine and sine functions that have been phase shifted relative to the true encoder phase by the pre-determined phase shift of the observer error transfer function. The resulting four products are integrated and the output of the four integrators are fed back as corrections to the encoder cosine and sine channels. The compensation is considered adaptive due to the continuous update of the Fourier coefficients that are used to correct the read head signals. The Fourier coefficients will converge to the correct compensation values when the estimator error no longer contains error components that correlate with the $1^{st}$ and $2^{nd}$ harmonics of the encoder.

Figure 10:
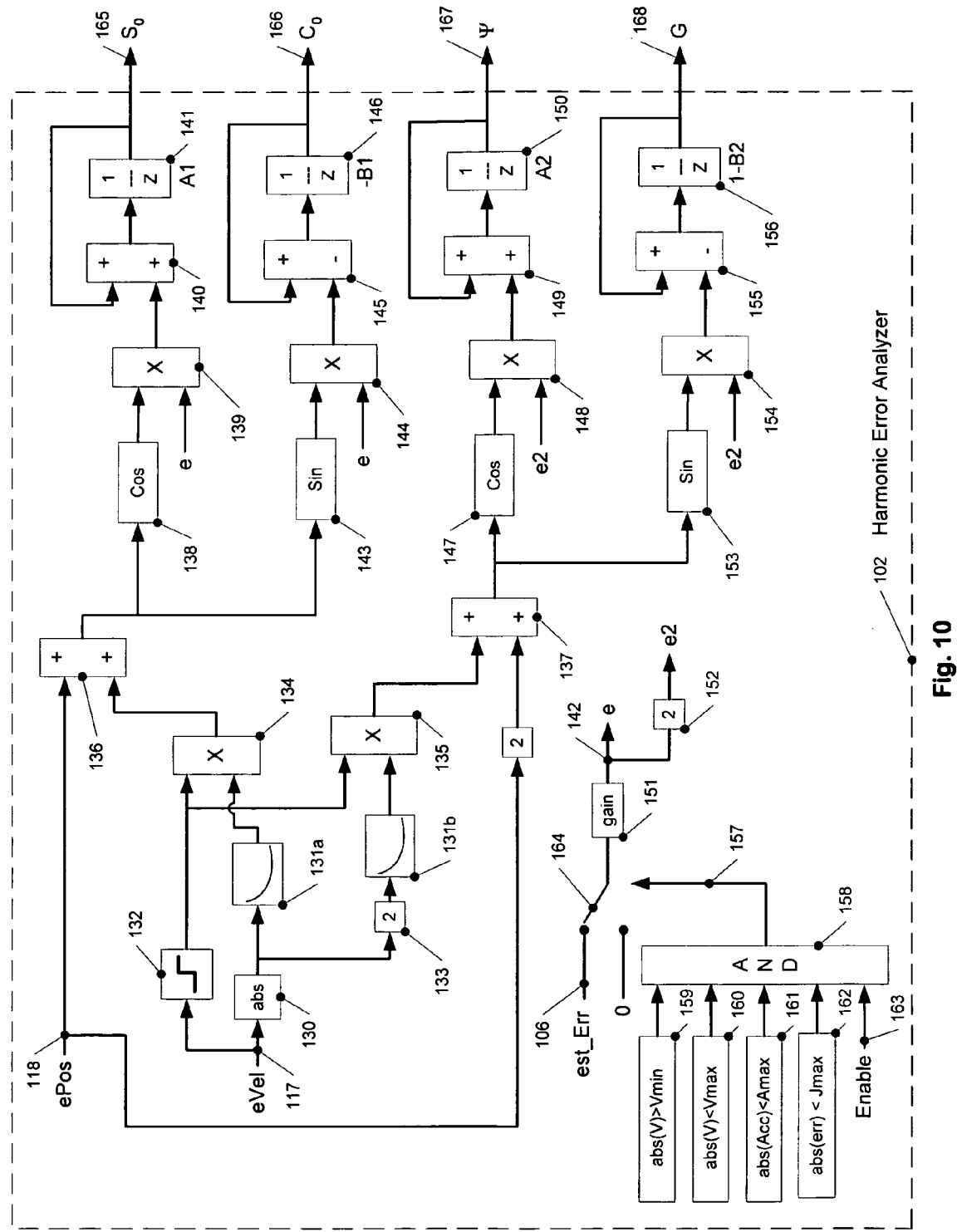
FIG. 10 is a block diagram showing a harmonic error analyzer according to an embodiment of the system described herein.

Referring to FIG. 10, the four compensation coefficients ($C_0$, $S_0$, $\Psi$ and G) are produced by discrete integrators A1 141, –B1 146, A2 150, and 1-B2 156. The input to integrator A1 141 is the product of error "e" and the cosine of the phase of the encoder, shifted by an angle that is a function of encoder velocity. Nominal encoder phase (ePos 118) is combined in summer 136 with a phase correction that is determined based on the velocity of the encoder. The absolute value 130 of encoder velocity (eVel, 117) is used in lookup table 131*a* to determine the magnitude of phase correction that is needed. The sign of the correction is determined by taking the sign of encoder velocity in sign block 132 and multiplying by phase magnitude in multiplier 134. The resulting shifted phase is used in cosine and sine blocks 138 and 143 to derive cosine and sine signals that are multiplied with error "e" in blocks 139 and 144.

When the harmonic error analyzer 102 is adapting, estimator error (est_Err 106) is multiplied by a gain in block 151 to form error "e". Under certain conditions, adaptive compensation is disabled based on signal 157. When disabled, error "e" is set to 0 and the four integrators 141, 146, 150 and 156 hold their current value (non adaptive). The $2^{nd}$ order corrections ($\Psi$, G) are produced in a similar fashion. Since the $2^{nd}$ harmonic errors occur at twice the frequency of the $1^{st}$ order harmonics, a different phase shift is required. Gain block 133 scales absolute velocity by a factor of 2 to form an index into phase table 131*b*. The $2^{nd}$ order phase magnitude is combined with the sign of velocity in multiplier 135 to form the $2^{nd}$ order phase correction that is combined in summer 137 with ePos to form $2^{nd}$ order absolute phase. The $2^{nd}$ order absolute phase is used in cosine 147 and sine 153 blocks to produce the signals that multiply error "e2" at the input to $2^{nd}$ order integrators 150 and 156. Note that the initial condition on unit delay 156 is 1 whereas all other unit delay initial conditions are 0. Also, the sign of the error input to summer 155 is inverted. Thus, integrator 156 produces signal 1-B2 rather than B2. This is the proper sign convention for the relative gain compensation signal G that is used in signal compensation block 10.

The input to summer 145 is also inverted in order to produce –B1 at the output of integrator 146 as required for cosine offset compensation. Error "e2" is simply 2 times error "e" due to multiplier 152.

The adaptive function of the compensator is disabled at very low speeds when the magnitude of encoder errors is significantly attenuated by the observer error transfer function (reduced amplitude at low frequency, FIG. 9). In a preferred embodiment, the low frequency cutoff is approximately $\frac{1}{10}^{th}$ the bandwidth of the observer: 200 Hz for a 2 kHz observer bandwidth.

The adaptive function is also disabled at very high speeds, high acceleration and during periods of high rate of change of acceleration. At high speeds, compensation becomes irrelevant since the state estimator rejects the high frequency errors regardless of compensation. High accelerations are more likely to excite vibration modes in the is machine elements connected to the encoder. Extraneous vibrations could be mistaken for encoder errors if they happened to coincide with the $1^{st}$ or $2^{nd}$ harmonics. Note that only the adaptive function is disabled under these conditions. If a high acceleration event is preceded by movement at a moderate speed under modest acceleration conditions, the adaptive process will quickly converge on the corrections that minimize errors. These corrections will continue to be applied during periods of high acceleration. With a $3^{rd}$ order state estimator, there will be a static observer error under conditions of constant rate of change of acceleration (i.e. constant jerk). A static observer error would cause a distortion in the compensation coefficients. Turning off the adaptive part of compensation during periods of significant jerk avoids the distortion that would otherwise occur.

In an embodiment, a signal may be provided that can be used to disable the adaptive portion of compensation. In certain applications, it may be desirable to perform compensation once as part of a setup operation and store the compensation corrections. During normal operation, the stored compensation corrections are used to reduce encoder errors. With some encoders, the compensation corrections vary only slightly with position of the axis and over time. In those cases, the setup only needs to be performed once. In other cases, further error reduction may be possible by leaving the adaptive compensation enabled at all times.

The adaptive enable signal 157 is produced by the logical combination of five conditions in AND block 158. For adaptive to be enabled, the external Enable signal 163 must be true, the absolute value of velocity must be greater than Vmin 159 and less than Vmax 160, absolute acceleration must be less than Amax 161 and the absolute estimator error signal must be less than Jmax 162. Referring to FIG. 7, note that a non-zero est_Err signal 106 will cause integrator 109 to integrate so as to always drive est_Err to zero. Under a condition of constant acceleration, est_Err will initially be non-zero, but soon the output of integrator 109 will converge upon the proper estimated acceleration eAcc 116 that drives est_Err to zero. With est_Err at zero, estimated velocity 117 and estimated position 118 track true velocity and position without error (since est_Err is zero). During acceleration transients (i.e., when the derivative of acceleration, or jerk, is non-zero), est_Err will also be non-zero. Thus, est_Err can be used as a proxy for jerk in order to determine a condition when adaptive compensation should be disabled.

In an embodiment, the minimum velocity threshold is set at $2*\pi*200$ Hz which equates to an axis speed of 12 rpm for a 1024 line rotary encoder or 4 mm/sec for a 20 micron pitch linear encoder. Maximum speed for adaptation is set at $2*\pi*100$ kHz or 5860 rpm for a 1024 line rotary encoder or 2 M/sec for a 20 micron linear encoder. The acceleration threshold is set at $4e^6$ radians/sec$^2$. For a 1024 line rotary encoder, the axis acceleration limit is 44,000 rpm/sec. For a linear encoder with 20 micron pitch, the axis acceleration limit is 15 meters/sec$^2$ or 1.5 G's.

The rate at which adaptation occurs depends upon the adaptive gain 151. A slow rate of adaptation is appropriate when the encoder errors vary only slightly with axis position. In other cases, a more rapid adaptation rate will allow the adaptive compensation to track the encoder errors as they vary with stage motion. In some applications, the encoder errors can be learned during a setup procedure as a function of axis position and stored. Then the adaptive portion of compensation can be disabled. During normal operation the stored compensation corrections can be recalled and will correct the encoder errors regardless of axis position, speed or acceleration.

In an embodiment, the rate of adaptation can be set to converge on the correct compensation coefficients within 10 to 20 periods of the encoder. For a 1024 line rotary encoder, adaptation will converge within approximately 3° of axis motion. For a 20 micron pitch linear encoder, adaptation will converge within approximately 0.3 millimeters of axis motion.

Gain block 151 of FIG. 10 is set to the desired rate of convergence. For an observer bandwidth of 2 kHz and sample rate of 10 Mhz (Ts=0.1 µseconds), a convergence gain 151 of 0.00025 is desirable.

When the adaptive compensation function is first turned on, the bias and quadrature compensation values are initially 0 and the relative gain compensation is initially 1.

The state estimator of FIG. 7 includes seven multipliers. Multipliers 103 and 104 are used to compute the phase difference (est_Err 106). Multipliers 107a, 107b, 107c, 110 and 113 provide scaling of various signals. Multipliers consume significant resources in a FPGA or ASIC implementation of the enhanced precision encoder interpolator. In order to minimize the cost of implementation, there is a desire to reduce the number of multipliers wherever possible.

Figure 11:
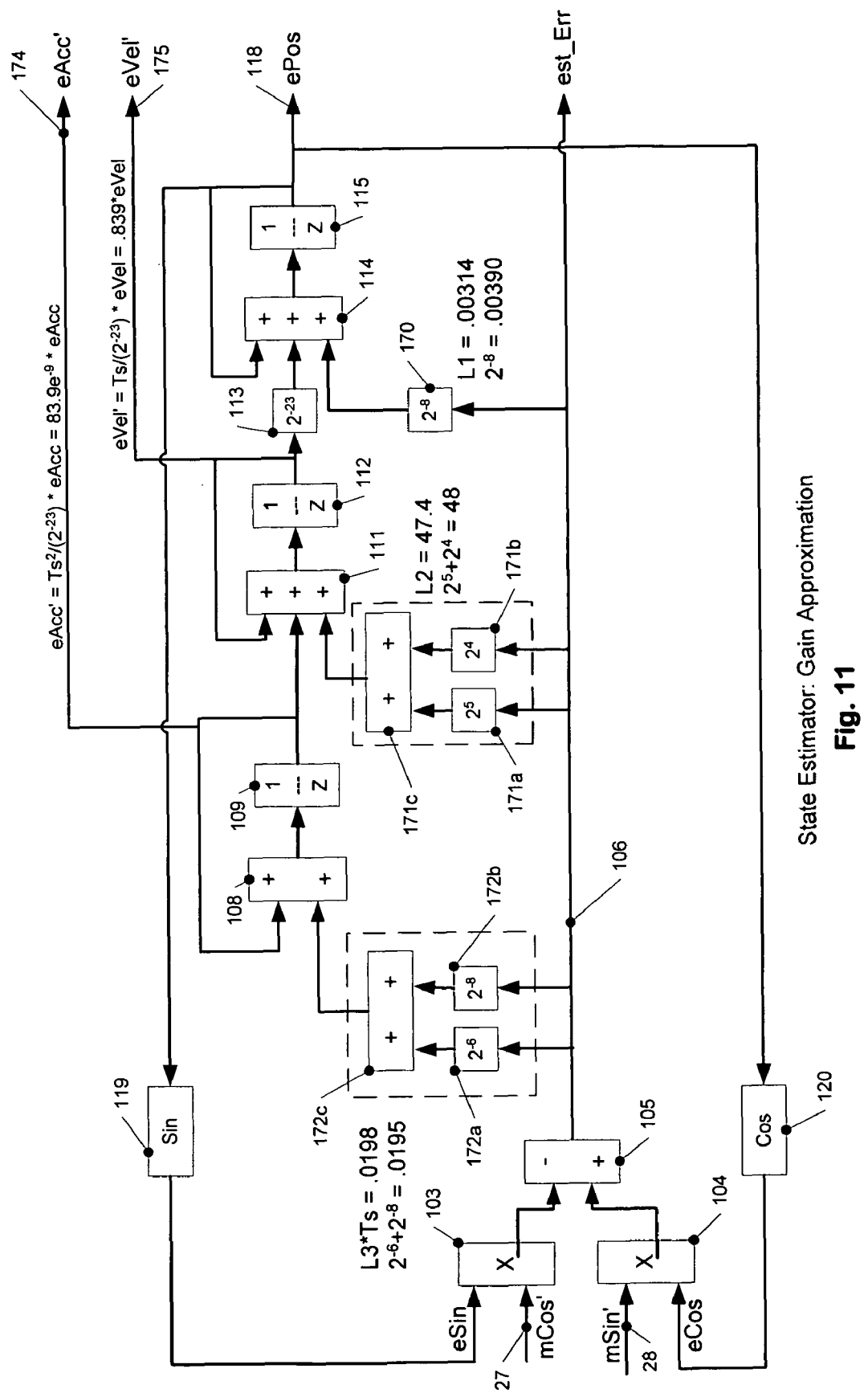
FIG. 11 is a block diagram of a $3^{rd}$ order state estimator that produces approximately the same response as the configuration shown in FIG. 7 using bit-shifting in place of multipliers according to an embodiment of the system described herein.

FIG. 11 is an equivalent implementation of the state estimator where five of the original seven multipliers have been eliminated in order to reduce the cost of implementation. The particular implementation shown in FIG. 11 is configured for a sample rate of 10 Mhz (Ts=0.1 µseconds) and estimator bandwidth $F_0$ of 2 kHz. For this particular configuration, the estimator gains (L1, L2, L3) are selected as:

$$L1 = 2.5*(2*\pi*2e^3)*1e^{-7} = 0.00314;$$

$$L2 = 3*(2*\pi*2e^3)^2*1e^{-7} = 47.4;$$

$$L3 = (2*\pi*2e^3)^3*1e^{-7} = 198e^3.$$

Gain block 107c (L1) can be approximated by a bit shift 170 of $2^{-8}$ which gives a gain of 0.0039 rather than the nominal gain of 0.00314. Those skilled in the art recognize that a bit shift operation uses far fewer resources in a FPGA or ASIC compared to a multiplier. Gain L2 can be approximated by the sum 171c of two bit shift factors (171a, 171b) $2^5+2^4=48$ (compared to desired L2 gain of 47.4). The nominal gain for L3 is $198e^3$. However, by moving gain block 110 (Ts) to precede integrator 109, the new gain becomes $198e^3*1e^{-7}$ or 0.0198. This can be approximated as the sum 172c of bit shifts $2^{-6}$ and $2^{-8}$ (172a, 172b). The resulting gain of 0.0195 is a very close approximation to the desired gain 0.0198. Note that this also eliminates gain block 110 between integrator 109 and summer 111. The remaining gain block 113 can be implemented by a bit shift of $2^{-23}$ which is an approximation to the sample period of $1e^{-7}$ ($2^{-23}=1.19e^{-7}$ versus $1.00e^{-7}$). The approximations produce negligible change in the transfer functions shown in FIGS. 8 and 9. However, the state estimator outputs are scaled as a result of the approximations. Estimated error (est_Err 106) and estimated position (ePos 118) are unaffected by the approximations. Estimated velocity is scaled by the ratio of $Ts/2^{-23}$ or eVel' 175 is 0.839*eVel 117. The signal eAcc' 174 is scaled by $Ts^2/2^{-23}$ or $83.9e^{-9}$*eAcc 116. The thresholds used to determine when adaptive compensation is enabled in the harmonic error analyzer must be configured for the scaled state signals (eVel' and eAcc') that are used in place of the true state signals (eVel and eAcc).

Figure 12:
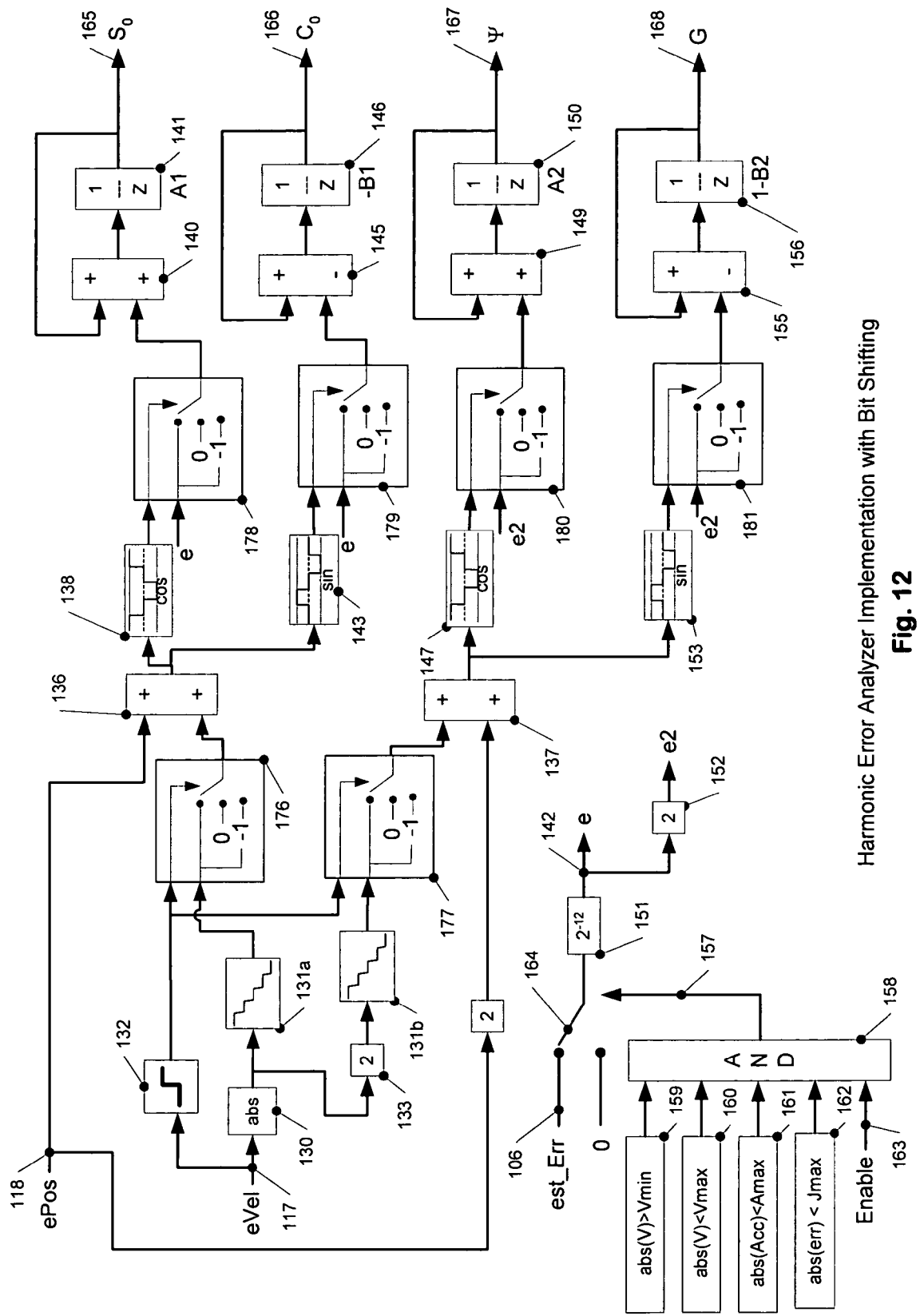
FIG. 12 is a block diagram of the harmonic error analyzer using bit shifting in lieu of multipliers and low-resolution cosine and sine approximations according to an embodiment of the system described herein.

The harmonic error analyzer 102 can be more economically implemented by eliminating multipliers (FIG. 12). The Fourier transform is very insensitive to the fidelity of the cosine and sine functions that are multiplied by the errors in multipliers 139, 144, 148 and 154 of FIG. 10. This observation permits the use of a crude approximation to the cosine function using only the values 1, 0 and −1 in selected quadrants (block 138, 147). A similar approximation for sine (blocks 143, 153) can be used in place of calculating the true sine function. Since the outputs of the cosine and sine blocks are either 1, 0 or −1, the multipliers 139, 144, 148 and 154 can be replaced by switched adders (178, 179, 180 and 181).

When the cosine input is 1, the error is added to the respective integrator. When it is 0, the integrator does not change. When the cosine is −1, the error signal is subtracted from the integrator.

Multipliers 134 and 135 of FIG. 10 can also be replaced by switched adders 176 and 177 of FIG. 12 to handle the sign of the phase shift as a function of encoder absolute velocity. The phase shift maps 131*a* and 131*b* can be approximated with a coarse lookup table. Since the Fourier coefficients are inside a feedback loop (the coefficients affect the compensation which in turn affects the error that drives the Fourier coefficients), the coefficients will converge as long as the proper phase relationship between estimated error (est_Err) and phase angle (ePos) is maintained within a range of approximately +/−60°. The relaxed tolerance on phase angle allows a modest resolution lookup table to be used to store the predetermined phase as a function of encoder speed and estimator bandwidth.

Finally, there is considerable latitude in selecting the rate of convergence of the compensation signals. This permits the use of an approximation to the nominal convergence gain 151 that can be implemented by a bit shift operation in lieu of a multiplier. For a nominal convergence gain 151 of 0.00025, a gain of $2^{-12}$ (0.000244) can be used as an approximation.

One skilled in the art will recognize that for alternative sample rates, estimator bandwidths or adaptive rates of convergence, different gains will be required. Some settings may require more or less bit shifting terms to produce the desired approximate gains. Other settings may require one or more multipliers if no suitable combination of bit shifting can be realized.

For the configuration shown in FIGS. 11 and 12, the enhanced precision encoder interpolator requires two multipliers (103 and 104 of FIG. 7) that would not be found in a prior art interpolator. However, the two multipliers eliminate the need to compute the arctangent function which may be a net savings of FPGA or ASIC resources in some implementations.

The following references are all incorporated herein by reference:

U.S. Patent Documents:

| 4,225,931 | Sep. 30, 1980 | Schwefel | 364/577; |
|---|---|---|---|
| 5,066,953 | Nov. 19, 1991 | Lengenfelder et al. | 341/155; |
| 5,134,404 | Jul. 28, 1992 | Peterson | 341/116; |
| 5,374,883 | Dec. 20, 1994 | Morser | 318/605; |
| 5,444,240 | Aug. 22, 1995 | Nakayama | 250/237; |
| 5,463,393 | Oct. 31, 1995 | Havlicsek | 341/115; |
| 5,726,445 | Mar. 10, 1998 | Thaler et al. | 250/237; |
| 5,814,812 | Sep. 29, 1998 | Holzapfel | 250/231.16; |
| 6,232,594 | May 15, 2001 | Eccher et al. | 250/231.14; |
| 6,407,683 | Jun. 18, 2002 | Dreibelbis | 341/111; |
| 6,556,153 B1 | Apr. 29, 2003 | Cardamone | 341/111; |
| 6,654,508 B1 | Nov. 25, 2003 | Markham | 382/291; |
| 6,686,585 B2 | Feb. 3, 2004 | Grimes et al. | 250/231.13; |
| 6,816,091 B1 | Nov. 9, 2004 | Chee | 341/13; |
| 6,897,435 B2 | May 24, 2005 | Remillard et al. | 250/231.13; |
| 6,956,505 B2 | Oct. 18, 2005 | Taniguchi et al. | 341/11; |
| 6,973,399 B1 | Dec. 6, 2005 | Burgschat et al. | 702/106; |

OTHER PUBLICATIONS

C. E. Shannon, "Communication in the presence of noise", Proc. Institute of Radio Engineers, vol. 37, no. 1, pp. 10-21, January 1949. Reprint as classic paper in: Proc. IEEE, Vol. 86, No. 2, (February 1998);

DR. Johannes Heidenhain Gmbh, "Encoders for Servo Drives", November 2007, pg 25;

Renishaw plc, "Signum SR, Si encoder system", L-9517-9155-03-A, July, 2007;

MicroE Systems, "Mercury II 4000 Series", DS-Mercury II Rev. S14, 2006, pg 6;

Numerik Jena Gmbh, "RIK Rotary Encoder System Compact Model Range", RIK-D-e-09/06, 2006, pg 3-7.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An encoder interpolator, comprising:
  a state estimator that demodulates and interpolates received encoder signals, wherein the state estimator incorporates a model of a physical system being monitored by an encoder being processed, wherein a sample rate of the state estimator is faster than a highest frequency of the encoder being processed, and wherein the state estimator determines an estimated position of the physical system being monitored by the encoder being processed and compares the estimated position with an encoded position that is encoded in the received encoder signals, wherein the state estimator determines an estimated error that is a difference between the estimated position determined using the model and the encoded position determined from the received encoder signals, and wherein the state estimator outputs the estimated position and the estimated error; and
  a circuit that receives from the state estimator the estimated position and the estimated error and determines update information that is used to modify the encoder signals that are received by the state estimator.

2. The encoder interpolator according to claim 1, wherein the estimated error drives states of the state estimator through gains that are predetermined to achieve a desired bandwidth.

3. The encoder interpolator according to claim 1, wherein the encoder interpolator is implemented as at least one of: an application specific integrated circuit (ASIC), a digital signal processor (DSP) and a field programmable gate array (FPGA).

4. The encoder interpolator according to claim 1, wherein the sample rate is set higher than an analog bandwidth of a read head of the encoder.

5. The encoder interpolator according to claim 1, wherein the update information provides compensation for at least one of: signal offsets, relative gain and quadrature errors.

6. The encoder interpolator according to claim 1, wherein the circuit is an adaptive compensation circuit that implements a Fourier transform of 1st and 2nd harmonics of the estimator error.

7. The encoder interpolator according to claim 6, wherein resulting Fourier coefficients of the Fourier transform are the update information that is applied to the encoder signals in a feedback loop that drives selected harmonics of encoder error to zero.

8. The encoder interpolator according to claim 1, further comprising:
an analog to digital converter (ADC) that digitizes the received encoder signals.

9. The encoder interpolator according to claim 1, wherein the state estimator further determines an estimated velocity and an estimated acceleration.

10. A method of providing encoder interpolation, comprising:
receiving encoder signals at a state estimator that incorporates a model of a physical system being monitored by an encoder being processed;
demodulating and interpolating the received encoder signals, wherein a sample rate of the demodulating and interpolating is faster than a highest frequency of the encoder being processed;
determining, using the state estimator, an estimated position of the physical system being monitored by the encoder being processed;
comparing, using the state estimator, the estimated position with an encoded position that is encoded in the received encoder signals, wherein the state estimator determines an estimated error that is a difference between the estimated position determined using the model and the encoded position determined from the received encoder signals;
outputting, from the state estimator, the estimated position and the estimated error;
determining update information using the estimated position and the estimated error; and
using the update information to modify the received encoder signals that are received by the state estimator.

11. The method according to claim 10, wherein the update information provides compensation for at least one of: signal offsets, relative gain and quadrature errors.

12. The method according to claim 10, further comprising:
implementing a Fourier transform of 1st and 2nd harmonics of the estimator error.

13. The method according to claim 12, wherein resulting Fourier coefficients of the Fourier transform are the update information that is applied to the encoder signals in a feedback loop that drives selected harmonics of encoder error to zero.

14. The method according to claim 10, further comprising:
digitizing the encoder signals.

15. The method according to claim 10, further comprising:
determining an estimated velocity and an estimated acceleration.

16. A non-transitory computer readable storage medium storing computer software that provides encoder interpolation, the computer software comprising:
executable code that receives encoder signals at a state estimator that incorporates a model of a physical system being monitored by an encoder being processed;
executable code that demodulates and interpolates the received encoder signals, wherein a sample rate of the demodulating and interpolating is faster than a highest frequency of the encoder being processed; and
executable code that determines, using the state estimator, an estimated position of the physical system being monitored by the encoder being processed;
executable code that compares, using the state estimator, the estimated position with an encoded position that is encoded in the received encoder signals, wherein the state estimator determines an estimated error that is a difference between the estimated position determined using the model and the encoded position determined from the received encoder signals;
executable code that outputs, from the state estimator, the estimated position and the estimated error;
executable code that determines update information using the estimated position and the estimated error; and
executable code that uses the update information to modify the received encoder signals that are received by the state estimator.

17. The non-transitory computer readable storage medium according to claim 16, wherein the update information provides compensation for at least one of: signal offsets, relative gain and quadrature errors.

18. The non-transitory computer readable storage medium according to claim 16, further comprising:
executable code that implements a Fourier transform of 1st and 2nd harmonics of the estimator error.

19. The non-transitory computer readable storage medium according to claim 18, wherein resulting Fourier coefficients of the Fourier transform are the update information that is applied to the encoder signals in a feedback loop that drives selected harmonics of encoder error to zero.

20. The non-transitory computer readable storage medium according to claim 16, further comprising:
executable code that determines an estimated velocity and an estimated acceleration.

* * * * *